United States Patent [19]
Kato et al.

[11] Patent Number: 6,083,137
[45] Date of Patent: Jul. 4, 2000

[54] POWER ROLLER BEARING FOR TROIDAL TYPE CONTINUOUS VARIABLE TRANSMISSION SYSTEM

[75] Inventors: Hiroshi Kato; Hirotoshi Aramaki; Nobuo Goto; Takashi Imanishi; Tutomu Abe, all of Kanagawa, Japan

[73] Assignee: NSK Ltd., Tokyo, Japan

[21] Appl. No.: 09/158,108

[22] Filed: Sep. 22, 1998

[30] Foreign Application Priority Data

Sep. 22, 1997 [JP] Japan ................................... 9-257144
Oct. 13, 1997 [JP] Japan ................................... 9-279077

[51] Int. Cl.[7] .................................................. F16H 57/04
[52] U.S. Cl. .................................. 476/8; 476/40; 384/614
[58] Field of Search ................................. 476/8, 40, 46; 384/614

[56] References Cited

U.S. PATENT DOCUMENTS

| | | | |
|---|---|---|---|
| 899,563 | 9/1908 | Riebe ....................................... | 384/614 |
| 1,242,911 | 10/1917 | Beemer .................................... | 384/614 |
| 1,246,001 | 11/1917 | Fox et al. ................................. | 384/614 |
| 5,391,126 | 2/1995 | Fukushima et al. ....................... | 476/46 |
| 5,575,733 | 11/1996 | Machida et al. ........................... | 476/40 |
| 5,830,103 | 11/1998 | Itoh et al. .................................. | 476/8 |

FOREIGN PATENT DOCUMENTS 7-174146  7/1995  Japan ............................... F16C 33/66

*Primary Examiner*—David M. Fenstermacher
*Attorney, Agent, or Firm*—Sughrue, Mion, Zinn, Macpeak & Seas, PLLC

[57] ABSTRACT

A power roller for a toroidal type continuous variable transmission system comprises a trunnion having a central shaft, a bearing outer race connected to the trunnion, one face of which is provided with a first track groove concentric with the central shaft, a power roller rotatably mounted on one end portion of the central shaft, the power roller having a face opposing to the one face of the bearing outer race, the face being provided with a second track groove concentric with the central shaft, a plurality of rolling elements retained between the bearing outer race and the power roller and capable of rotating within a track formed by the first track groove and the second track groove, and a disk-like cage coaxially disposed between the bearing outer race and the power roller and rotatable about the central shaft, the cage including a plurality of through pockets for accommodating the rolling elements therein so as to retain the rolling elements within the track, the pockets being arranged at regular intervals in the circumferencial direction thereof, wherein the cage being capable of absorbing movement to which the rolling elements is subjected via the trunnion and the bearing outer race in a radial direction thereof.

6 Claims, 14 Drawing Sheets

FIG. 8 PRIOR ART
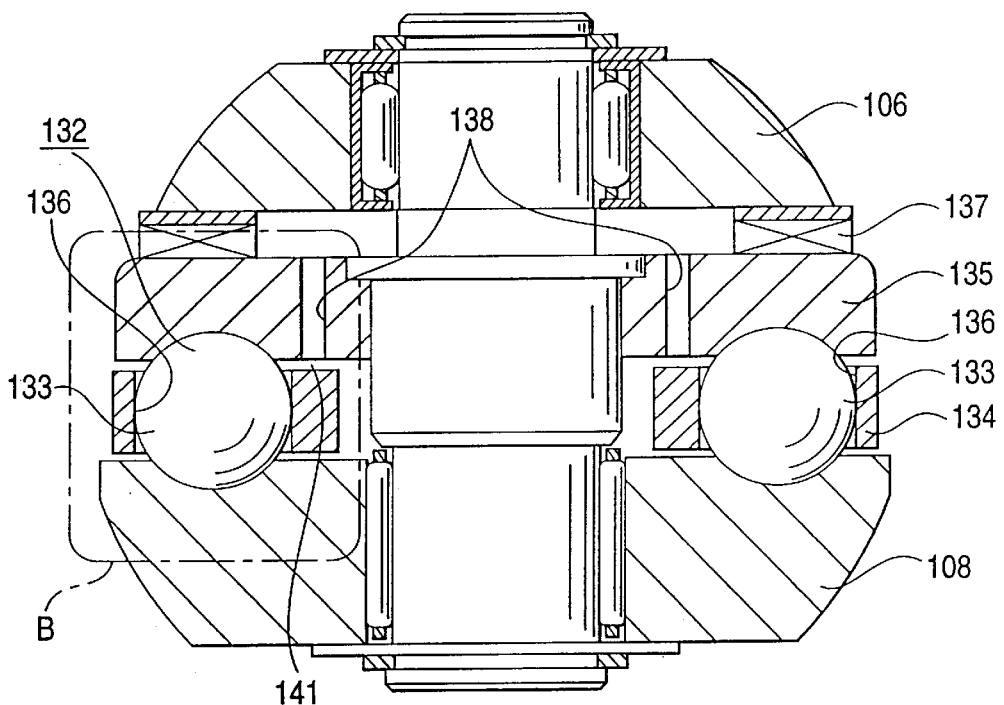
FIG. 9 (A) PRIOR ART
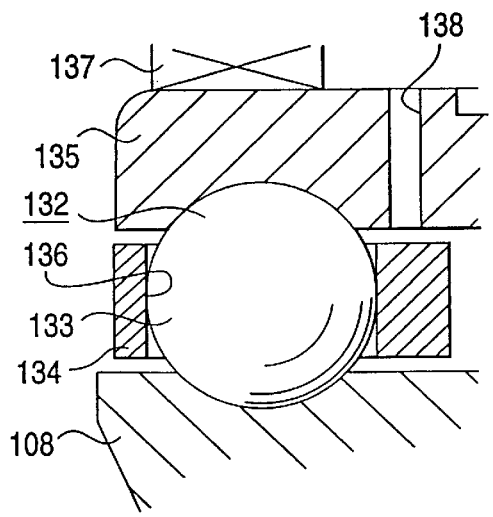
FIG. 9 (B) PRIOR ART
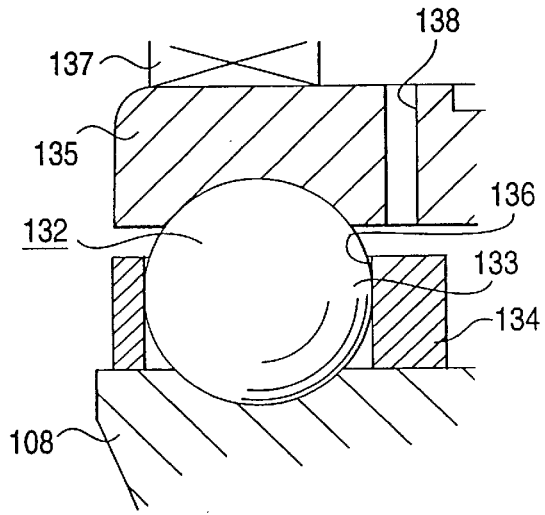

POWER ROLLER BEARING FOR TROIDAL TYPE CONTINUOUS VARIABLE TRANSMISSION SYSTEM

BACKGROUND OF THE INVENTION

The present invention relates to a power roller bearing for use in a toroidal type continuous variable transmission system used as a transmission of an automobile or the like.

A toroidal type continuous variable transmission system, which has been conventionally developed mainly as a transmission of an automobile, comprises a toroidal type transmission mechanism structured such that input and output disks with their respective mutually opposing faces having an arc-shaped cross section are combined with a power roller rotatably held by and between the input and output disks. The input disk is drivably connected to a torque input shaft in such a manner that it can be moved in a torque input shaft direction and, on the other hand, the output disk is mounted opposed to the input disk in such a manner that it can be relatively rotated with respect to the torque input shaft and is limited in the movement thereof in a direction where it moves away from the input disk.

In the above-mentioned toroidal type transmission mechanism, if the input disk is rotated, then the output disk is rotated in the opposite direction through the power roller, so that a rotational motion input to the torque input shaft is transmitted to the output disk as an opposite-direction rotational motion and is then taken out there. In this transmission, if the inclination angle of the rotary shaft of the power roller is caused to vary in such a manner that the peripheral face of the power roller can be contacted not only with the adjoining portion of the outer periphery of the input disk and but also with the adjoining portion of the center of the output disk, then the rotational motion to be transmitted from the torque input shaft to an output gear can be increased in speed; and, on the other hand, if the inclination angle of the rotary shaft of the power roller is caused to vary in such a manner that the peripheral face of the power roller can be contacted not only with the adjoining portion of the center periphery of the input disk and but also with the adjoining portion of the outer periphery of the output disk, then the rotational motion to be transmitted from the torque input shaft to the output gear can be reduced in speed. Further, by controlling the inclination angle of the rotary shaft of the power roller properly, intermediate transmission ratios between the above conditions can also be obtained in an almost continuously variable manner.

The power roller is coupled to a trunnion to be mounted on a casing of the toroidal type continuous variable transmission system through a pivot shaft having a torsional position relation with respect to the torque input shaft, while the inclination angle of the power roller can be adjusted according to the swing motion of the trunnion about the pivot shaft. Between the power roller and trunnion, to keep the power roller in a freely rotatable manner, there is disposed a power roller bearing such as a thrust rotary shaft bearing or the like.

The power roller is composed of a bearing outer race and a plurality of rolling elements (here, balls); and, these rolling elements can be rolled in the circumferential direction thereof while they are held by and between the power roller and bearing outer race. To guide the rolling elements, on both of the back face of the power roller and the opposed face of the bearing outer race to the power roller, there are formed race grooves extending in the circumferential direction, while each race groove is formed in a circular shape. Also, in order that the rolling elements are respectively allowed to roll along their associated race grooves while being kept properly spaced from each other, there is combined such a hollow disk-shaped cage 1 as shown in FIG. 1. On the cage 1, there are formed a plurality of circular-shaped pocket holes 5 which are respectively so disposed as to correspond to the positions of the race grooves and extend in the thickness direction of the cage, while the rolling elements are disposed between the race grooves of the power roller and the bearing outer race in such a manner that they are rollably held in their respective circular-shaped pocket holes 5. By the way, in the structure shown in FIG. 5, since the rolling elements are balls, the pocket holes 5 are respectively formed in a circular shape. However, when the rolling elements are rollers or needle-like rollers, there may be formed pocket holes which are respectively formed in a proper shape corresponding to such rolling elements.

Since the above-mentioned power roller rotates at high speeds and transmits a drive force during the operation of the toroidal type continuous variable transmission system, the power roller bearing supporting such power roller requires high durability and reliability.

In the toroidal type continuous variable transmission system, when transmitting a large torque, a load applied to the power roller becomes excessively large. As a result of this, as shown in FIG. 2, a trunnion 11 supporting a power roller 10 is deformed to thereby generate a bending moment f in an arrow direction in FIG. 2; that is, the bending moment f is applied to an outer race 12 of a power roller bearing connected to the trunnion 11 to press and deform the same. If the outer race 12 of the power roller bearing is given the bending moment f from the trunnion 11 and is thereby deformed, then there cannot be obtained the smooth rolling movements of rolling elements 6 which are respectively disposed in their associated pocket holes.

Now, FIGS. 3 and 4 are respectively explanatory diagrams of the deformed state of the power roller bearing outer race 12 caused by the abovementioned reason. In particular, FIG. 3 shows an outer race 12a of the power roller bearing before it is deformed and FIG. 4 shows an outer race 12b of the power roller bearing after it is deformed, respectively viewed from the rotary shaft direction of the power roller 10. In FIGS. 3 and 4, the respective loci of the inside diameter side edge and outside diameter side edge of the race groove along which the rolling elements 6 are allowed to roll are denoted by dashed lines. Due to the influence of the bending moment f applied to the power roller bearing outer race 12 from the trunnion 11, the loci thereof respectively having an almost complete circular shape as shown in FIG. 3 are changed into those having an elliptical shape as shown in FIG. 4.

On the other hand, the bending moment f from the trunnion 11 is applied little onto the cage 1 of the power roller bearing which is not connected directly to the trunnion 11. For this reason, the power roller bearing cage 1 keeps its original shape approximate to a complete circular shape as it is; that is, similarly before the trunnion 11 is deformed, the cage 1 is going to maintain the rolling loci of the rolling elements 6 in their original shapes, or, in the complete circular shapes.

Owing to the combination of the thus deformed bearing outer race 12 with the cage maintaining its complete circular shape, the rolling elements 6 within the pocket holes 5 are respectively caused to roll along the complete circular shape within the race grooves deformed into the elliptical shapes, so that an excessive force is applied to the respective rolling elements 6. As a result of this, the rolling movements of the respective rolling elements 6 are extremely restricted to thereby cause the contact portions not only between the rolling elements 6 and bearing outer race 12 but also between the rolling elements 6 and cage to slip. Since the deterioration of the transmission efficiency caused by the slippage of the rolling elements 6 increases the power loss, the deformation of the trunnion 11 gives rise to the lowered reliability of the whole toroidal type continuous variable transmission system. Also, in this case, the peripheral faces of the rolling elements 6 and the respective race grooves suffering from the excessive forces are very easy to be worn and damaged; that is, such wear and damage provide the cause for the shortened life of the power roller bearing.

On the other hand, as a transmission for an automobile, it has been studied to use such a toroidal type continuous variable transmission system as shown schematically in FIGS. 5 and 6. In this toroidal type continuous variable transmission system, for example, as disclosed in Japanese Utility Model Publication No. Sho. 62-71465, an input side disk 102 is supported coaxially with an input shaft 101 and an output side disk 104 is fixed to the end portion of an output shaft 103. And, on the inner face of a casing in which the toroidal type continuous variable transmission system is stored, or on a bracket provided in the interior portion of the present case, there are disposed trunnions 106 which can be respectively swung about pivot shafts 105 having torsional position relations with respect to the input shaft 101 and output shaft 103.

The respective trunnions 106 include the pivot shafts 105 on the outside faces of their respective two side end portions. Also, the base end portions of shift shafts 107 are supported on the respective central portions of the two trunnions 106. That is, with use of this structure, if the terunnions 106 are respectively swung about the pivot shafts 105, then the inclination angles of the shift shafts 107 can be adjusted freely. Further, two power rollers 108 are rotatably supported on the respective peripheries of the shift shafts 107 respectively supporting the trunnions 106. And, the two power rollers 108 are held by and between the input side and output side disks 102 and 104. While the input side and output side disks 102 and 104 respectively include inside faces 102a and 104a which are opposed to each other, each of the inside faces 102a and 104a includes a cross section which is formed as an arc-shaped concave face with its associated pivot shaft 105 as the center thereof. And, the peripheral faces 108a of the power rollers 108, which are respectively formed as spherical convex faces, are in contact with the inside faces 102a respectively.

Also, between the input shaft 101 and input side disk 102, there is interposed a pressing device 109 of a loading cam type, while the pressing device 109 elastically presses against the input side disk 102 toward the output side disk 104. The pressing device 109 is composed of a cam plate 110 rotatable together with the input shaft 101 and a plurality (for example, four pieces) of rollers 112 respectively held by a cage 111. On one side face (in FIGS. 5 and 6, on the left face) of the cam plate 110, there is formed a cam face 113 which is a concavo-convex (that is, wavingly curved) face extending in the circumferential direction of the cam plate 110 and, on the outside face (in FIGS. 5 and 6, on the right face) of the input side disk 102 as well, there is formed a similar cam face 114. And, the above-mentioned plurality of rollers 112 are supported in such a manner that they can be rotated about their own axes which respectively extend in the radial direction with respect to the center of the input shaft 1.

When the above-structured toroidal type continuous variable transmission system is in operation, if the cam plate 110 is rotated in linking with the rotation of the input shaft 101, then the cam face 113 presses the plurality of rollers 112 against the cam face 114 of the outside face of the input side disk 102. As a result of this, the input side disk 102 is pressed against the plurality of power rollers 108 and, at the same time, due to the mutual pressing contact of the pair of cam faces 113 and 114 with the plurality of rollers 112, the input side disk 102 is rotated. And, the rotation of the input side disk 102 is transmitted through the plurality of power rollers 108 to the output side disk 104, so that the output shaft 103 fixed to the output side disk 104 can rotated.

Now, description will be given below of a case in which the rotation speeds of the input shaft 101 and output shaft 103 are to be changed. At first, to reduce the rotation speed between the input shaft 101 and output shaft 103, the trunnions 106 are swung in a predetermined direction about their respective pivot shafts 105. And, as shown in FIG. 5, the shift shafts 107 are respectively inclined in such a manner that the peripheral faces 108a of the power rollers 108, 108 can be respectively brought into contact not only with the portion of the inside face 102a of the input side disk 102 that is located near the center thereof but also with the portion of the inside face 104a of the output side disk 104 that is located near the outer periphery thereof. On the other hand, to increase the rotation speed, the trunnions 106 are swung in the opposite direction to the predetermined direction. And, as shown in FIG. 6, the shift shafts 107 are respectively inclined in such a manner that the peripheral faces 108a of the power rollers 108 can be respectively brought into contact not only with the portion of the inside face 102a of the input side disk 102 that is located near the outer periphery thereof but also with the portion of the inside face 104a of the output side disk 104 that is located near the center thereof. By the way, if the inclination angles of the shift shafts 107 are respectively set in the intermediate range between FIGS. 5 and 6, then intermediate transmission ratios can be obtained between the input shaft 101 and output shaft 103.

Further, FIG. 7 shows a toroidal type continuous variable transmission system disclosed in a microfilm of Japanese Utility Model Application Nos. Sho. 61-87523 and Sho. 62-199557, which proposes a more concrete structure as a transmission of an automobile. In this structure, the rotation of a crank shaft of an engine is transmitted through a clutch 115 to an input shaft 116 to thereby rotate a cam plate 110 which is spline engaged with the middle portion of the input shaft 116, so that a pressing device 109 including the cam plate 110 is actuated. And, due to the actuation of the pressing device 109, an input side disk 102 is rotated while it is being pressed in the left direction in FIG. 7 toward an output side disk 104. The rotation of the input side disk 102 is transmitted through power rollers 108 to the output side disk 104.

The output side disk 104 is supported by a needle bearing 117 on the periphery of the input shaft 116. Also, a cylindrical output shaft 118 formed integrally with the output side disk 104 is supported in the interior portion of a housing 119 by a ball bearing 120 of an angular contact type. On the other hand, one end (in FIG. 7, the right end) of the input shaft 116 is rotatably supported in the interior portion of the housing 119 by a roller bearing 121, while the other end thereof is rotatably supported in the interior portion of the housing 119 by a ball bearing 122 through a sleeve 123.

Also, a transmission gear 126, which is composed of a drive side advancing gear 124 and a drive side retreating gear 125 formed integrally with each other, is spline engaged with the outer peripheral face of the output shaft 118. When advancing an automobile, the transmission gear 126 is moved to the right in FIG. 7 to thereby bring the drive side advancing gear 124 into direct meshing engagement with a driven side advancing gear 128 which is provided in the middle portion of a take-out shaft 127. On the other hand, when retreating the automobile, the transmission gear 126 is moved to the left in FIG. 7 to thereby bring the drive side retreating gear 125 into meshing engagement with a driven side retreating gear 129 through an intermediate gear (not shown), while the driven side retreating gear 129 is fixed to the middle portion of the take-out shaft 27.

When the toroidal type continuous variable transmission system structured in the above-mentioned manner is in use, if the input shaft 116 is rotated through the clutch 115 by the engine to thereby move the transmission gear 126 in a proper direction, then the take-out shaft 127 can be rotated in an arbitrary direction. Also, if trunnions 106 are respectively swung to thereby change the contact positions between the peripheral faces 108a of the power rollers 108 and the inside faces 102a, 104a of the input side and output side disks 102, 104, then the rotation speed ratios between the input shaft 116 and take-out shaft 127 can be changed.

When the above-mentioned toroidal type continuous variable transmission system is in operation, by means of the operation of the pressing device 109, the input side disk 102 is pressed toward the output side disk 104. As a result of this, to the input shaft 116 supporting the cam plate 110 forming the pressing device 109, there is applied a thrust load going in the right direction in FIG. 7 as a reaction caused by the above pressing operation. The thrust load is received by the ball bearing 122 through not only a nut 130 which is engaged with the end portion of the input shaft 116 but also the sleeve 123. Also, due to the operation of the pressing device 109, a thrust load going in the left direction in FIG. 7 is applied to the output shaft 118 through the input side and output side disks 102 and 104 as well as through the power rollers 108. The thrust load is carried by the ball bearing 120 through a stop ring 31 which is fitted with the outside portion of the output shaft 118.

Also, when the above-mentioned toroidal type continuous variable transmission system is in operation, not only the thrust loads are respectively applied to the input shaft 116 and output shaft 118, but also thrust loads are applied to the power rollers 108 as well. Therefore, thrust rolling bearings 132, 132 are respectively interposed between the power rollers 108, 108 and trunnions 106, 106, so that the thrust loads applied to the power rollers 108, 108 can be received by these thrust rolling bearings 132. Each of the thrust rolling bearings 132 includes a plurality of rolling elements 133, a cage 134 which is used to hold the plurality of rolling elements 133 in a freely reliable manner, and an outer race 135. Each of the rolling elements 133 is formed of bearing steel or ceramics in a spherical shape or in a tapered roller shape. The rolling elements 133 can be rollingly contacted not only with race faces (inner race faces) formed on the outer end faces of the power rollers 108 but also with race faces (inner race faces) formed on the inner faces of the outer races 135. Also, the cage 134 is formed of metal or synthetic resin in a circular ring shape, and includes a plurality of pockets 136 which are respectively formed in the middle portion thereof in the diameter direction thereof at positions equally spaced in the circumferential direction thereof, while the rolling elements 133 are retained in these pockets 136, one rolling element in each pocket. Further, the outer races 135, which are formed of bearing steel or ceramics in a circular ring shape, are butted against the inside faces of the trunnions 106 through thrust bearings 137 (see FIG. 8 which will be discussed below), respectively.

The above-structured thrust rolling bearings 132, when the toroidal type continuous variable transmission system is in operation, rotate at high speeds while supporting the thrust loads applied onto the power rollers 108. For this reason, when the toroidal type continuous variable transmission system is in operation, a sufficient amount of lubrication oil must be supplied to the thrust rolling bearings 132. In view of this, conventionally, there has been proposed a lubrication method in which, as shown in FIG. 8, one or more oil supply holes 138 are formed in part of the outer race 135 and, when the toroidal type continuous variable transmission system is in operation, the lubrication oil is forcibly supplied into these oil supply holes 138. The lubrication oil forcibly supplied into the oil supply holes 138 is allowed to flow through gaps between the inner faces of the outer races 135 and the outer faces of the cages 134 as well as through gaps between the inner faces of the cages 134 and the outer end faces of the power rollers 108; that is, during such flow, the lubrication oil lubricates the rolling portions of the rolling elements 133.

By the way, in the structure for supplying the lubrication oil to the thrust rolling bearing 132 in the above-mentioned manner, there is a possibility that supply of the lubrication can be short in part. That is, as shown in FIG. 9(A), if the cage 134 is situated between the inner face of the outer race 135 and the outer end face of the power roller 108, then the lubrication oil flows not only into the gap between the inner face of the outer race 135 and the outer face of the cage 134 but also into the gap between the inner face of the cage 134 and the outer end face of the power roller 108; that is, in this case, there arises no problem. However, if the lubrication oil is discharged toward the outer face of the cage 134 from the oil supply hole 138, then the cage 134 is pushed by the flow of the lubrication oil, so that, as shown in FIG. 9(B), the cage 134 is shifted in position to the power roller 108 side. If the inner face of the cage 134 and the outer end face of the power roller 108 are closely contacted with each other due to such position shift of the cage 134, then a sufficient amount of lubrication oil is not present in the contact portion between the race face formed in the present outer end face and the rolling faces of the respective rolling elements 133. As a result of this, there is a possibility that an amount of wear in the contact portion between the race face formed in the present outer end face and the rolling faces of the respective rolling bodies 133 can increase and, what is worse, the present contact portion can be burnt and stuck together.

In order to solve the above problems, in Japanese Utility Model Publication No. Hei 7-35847, as shown in FIGS. 11 to 14, there is disclosed a toroidal type continuous variable transmission system which incorporates therein a thrust rolling bearing 132a improved in the lubrication performance thereof. A main body 139 of a cage 134a forming the present thrust rolling bearing 132a is formed of synthetic resin or metal such as copper or the like in a circular ring shape. In the middle portion of the main body 139 in the diameter direction thereof, in particular, at a plurality of portions thereof in the circumferential direction thereof, there are formed pockets 136 in such a manner that the pockets 136 respectively correspond in shape to rolling elements 133 to be held therein. Also, in the inner and outer faces of the main body 139, there are formed recessed grooves 140 in such a manner that they extend in the diameter direction of the main body 139 and cross the respective pockets 136; and, the recessed grooves 140 form a lubrication oil flow passage formed between the inner and outer peripheral edges of the main body 139.

According to the above-structured toroidal type continuous variable transmission system which incorporates therein the thrust rolling bearing 132a improved in the lubrication performance thereof, even when, due to the force of the lubrication oil that is jetted out from oil supply holes 138 formed in the outer race 135, the cage 134a forming the thrust rolling bearing 132a is shifted in the axial direction thereof and, as shown in FIG. 13, the inner face of the cage 134a and the outer end face of the power roller 108 are closely contacted with each other, a sufficient amount of lubrication oil are allowed to flow through the recessed grooves 140 into the pockets 136 respectively holding the rolling elements 133 therein. This prevents shortage of the lubrication oil existing in the contact portion between race faces respectively formed on the outer end faces of the power rollers 108 and the rolling faces of the rolling elements 133, which makes it possible to reduce the danger that part of the thrust rolling bearing 132a can be worn excessively or can be burnt and stuck together.

With use of the toroidal type continuous variable transmission system which is shown in FIGS. 10 to 13 and incorporates therein the thrust rolling bearing 132a improved in the lubrication performance thereof, when compared with the conventional toroidal type continuous variable transmission system, durability and reliability can be truly improved, but there are still left therein several inconveniences to be improved as follows. That is, the lubrication oil to be supplied into the pockets 136 respectively holding the rolling elements 133 therein is firstly supplied to the inner peripheral edge side of the cage 134a from the oil supply holes 138, is then allowed to flow through the respective recessed grooves 140, and is further sent into the respective pockets 136.

In particular, the lubrication oil is sent from the oil supply hole 138 into a space 141, which is formed between the power roller 108 and outer race 135 and also in which the cage 134a and rolling element 133 are disposed: that is, preferably, the thus sent lubrication oil may exist evenly over the whole periphery of the cage 134a; but, in fact, the lubrication oil exists unevenly in the peripheral direction of the cage 134a. Due to this, the amounts of the lubrication oil sent into the respective pockets 136 through the recessed grooves 40 are also uneven. Even if the amounts of the lubrication oil are slightly uneven, there can be scarcely raised a practical problem. However, if the amount of the lubrication oil that is sent into the space 141 from the oil supply hole 138 is reduced, then the amount of the lubrication oil that is sent into a certain pocket 136 becomes short, which can incur a possibility that wear in the contact portion between the rolling face of the rolling element 133 held in the present pocket 136 and its mating race face can be increased.

SUMMARY OF THE INVENTION

In view of the foregoing problems, it is therefore the first object of the present invention to provide, for use in a toroidal type continuous variable transmission system, a power roller bearing structured such that rolling elements can be respectively held within their associated pockets in such a manner that they can be shifted in position in the radial direction of a cage, whereby, even if the outer race of the power roller bearing is deformed due to application of a bending moment from a trunnion thereto, the outer race of the power roller bearing is prevented from restricting the rolling motion of its associated rolling element.

Furthermore, the second object of the present invention is to provide a structure in which the amounts of lubrication oil to be supplied into a plurality of pockets respectively formed in a cage can be made as even as possible.

To achieve the above objects, there is provided a power roller bearing for a toroidal type continuous variable transmission system which comprises: a trunnion having a central shaft; a bearing outer race connected to the trunnion, and the other face of which is provided with a first track groove concentric with the central shaft; a power roller rotatably mounted on one end portion of the central shaft, the power roller having a face opposing to the one face of the bearing outer race, the face being provided with a second track groove concentric with the central shaft; a plurality of rolling elements retained between the bearing outer race and the power roller and capable of rotating within a track formed by the first track groove and the second track groove; and a disk-like cage coaxially disposed between the bearing outer race and the power roller and rotatable about the central shaft, the cage including a plurality of through pockets for accommodating the rolling elements therein so as to retain the rolling elements within the track, the pockets being arranged at regular intervals in the circumferencial direction thereof, wherein the cage being capable of absorbing movement to which the rolling elements is subjected via the trunnion and the bearing outer race in a radial direction thereof.

In the power roller bearing, the cage may be composed of a plurality of hold plates which are formed by dividing the cage at regular angle in the circumferencial direction, each of the hold plates is movable independently in the radial direction.

In the power roller bearing, each of the through pockets in the cage may formed such that the respective rolling element is movable therein in the radial direction. For example, each of the through pockets may be formed such that a length dimension thereof in the radial direction is longer than a length dimension thereof in the circumferencial direction.

In the power roller bearing, the bearing outer race may include an oil supply passage for supplying lubrication oil to the cage, and the cage may include first oil grooves for supplying the lubrication oil supplied from the oil supply passage to the pockets and second oil grooves for discharging the lubrication oil in the pockets to the outside of the cage, each of the first oil grooves is positioned between the adjoining pockets and communicates the pockets with each other, and each of the second oil grooves communicates the respective pocket with the outside of the cage.

According to the power roller bearing of the present invention, since the rolling motion of the rolling element can be carried out smoothly even when the outer race of the power roller bearing is deformed, the reliability and durability of the power roller bearing can be improved.

Furthermore, according to the power roller bearing of the present invention, since the lubrication oil flowed into the first oil groove is distributed to the adjoining through pockets in the circumferential direction of the cage, even if the amounts of the lubrication oil existing in the periphery of the cage are uneven in the circumferential direction thereof, the degree of unevenness of the amounts of the lubrication oil flowing into the respective pockets can be controlled.

BRIEF DESCRIPTION OF THE DRAWINGS

In the accompanying drawings:

FIG. 8 is a section view showing a thrust rolling bearing and a lubrication member for the bearing in the conventional system of FIG. 7;

FIGS. 9(A) and (B) is an enlarged view of the B portion shown in FIG. 8, FIG. 9(A) shows a state in which good lubrication is obtained by the lubrication member shown in FIG. 8 and FIG. 9(B) shows a state in which poor lubrication is obtained;

FIG. 12 is a view of the portion of FIG. 11 when viewed from the right side there of;

DETAILED DESCRIPTION OF THE PREFERRED EMBODIMENTS

A power roller bearing for use in a toroidal type continuous variable transmission system according to the present invention is characterized in the structure of a cage included therein. And, as other remaining elements thereof than the cage, there can be used the respective parts of the conventional toroidal type continuous variable transmission system; that is, in this manner, the present power roller bearing for use in a toroidal type continuous variable transmission system can be structured such that it is able to carry out a substantially similar operation to the conventional power roller bearing for use in a toroidal type continuous variable transmission system.

Figure 14:
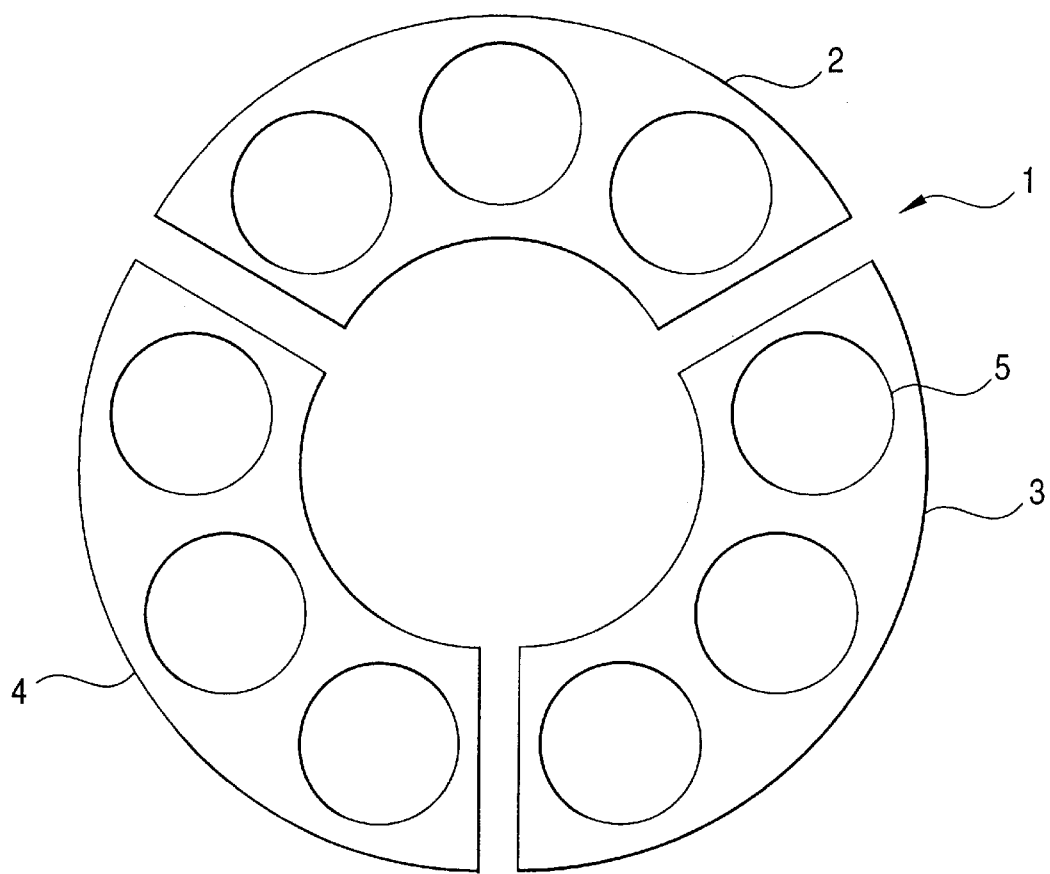
FIG. 14 is a front view of a first embodiment of a cage employed in a power roller bearing for use in a toroidal type continuous variable transmission according to the present invention.

Now, FIG. 14 shows a first embodiment of a cage which is incorporated into a power roller bearing for use in a toroidal type continuous variable transmission system according to the present invention. In the present embodiment, a cage 1 is composed of three hold plates 2, 3 and 4 which form a single hollow circular-ring shape as a whole, while the center angles of the respective hold plates 2, 3, and 4 are all set equal, that is, an angle of 120 deg. or so. Also, on the respective hold plates 2, 3 and 4, a plurality of circular pocket holes 5, which are so formed as to extend through their respective hold plates in the thickness direction thereof, are arranged in the circumferential direction of their respective hold plates; and, within the respective pocket holes 5, there can be held rolling elements (in the present embodiment, balls) in such a manner that they are free to roll. For this reason, the positions of the pocket holes 5 respectively correspond to the loci of race grooves formed not only in a power roller but also in the outer race of the power roller bearing.

In the thus structured cage, the three hold plates 2, 3 and 4 are respectively able to increase or decrease their respective radii from the center of rotation thereof (that is, the rotary shaft of the power roller) independently. Therefore, even when the outer race of the power roller bearing is deformed due to the bending moment applied thereto from the trunnion so that the loci of the race grooves are turned out of their original shape or a perfectly circular shape, the three hold plates 2, 3 and 4 are allowed to follow the positions of the rolling elements within the race grooves and thus move in the radial directions of the hold plates, thereby preventing generation of an unreasonable force which interferes with the rolling motion of the rolling elements. By the way, the number of hold plates, according to which the cage is divided into a plurality of hold plates, may not be three but, for example, it may be four or six; that is, even if the cage is equally divided into four or six sections, there can also be obtained a similar effect to the above. And, in the above-mentioned embodiment, three pocket holes 5 are formed in each of the three hold plates 2, 3 and 4. However, the number of pocket holes to be formed in each hold plate is not always limited to three.

Figure 1:
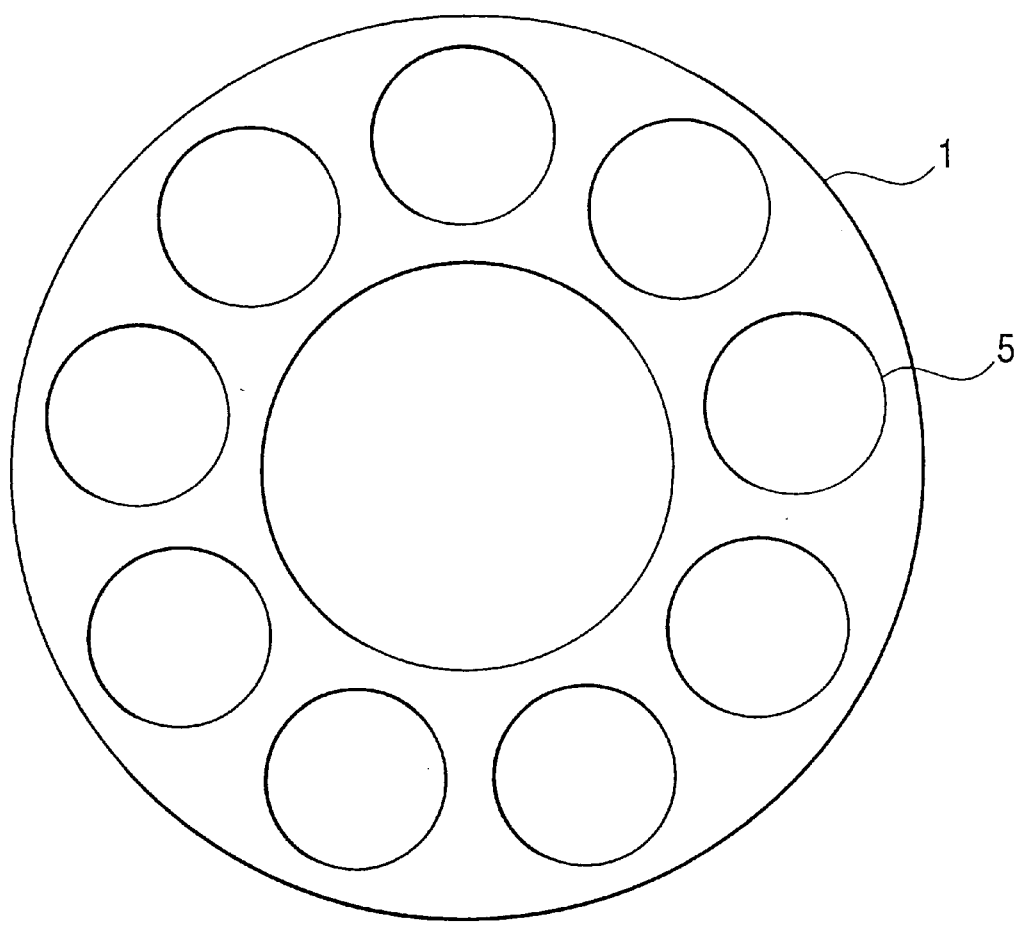
FIG. 1 is a front view of a cage employed in a conventional power roller bearing for use in a toroidal type continuous variable transmission system.
Figure 2:
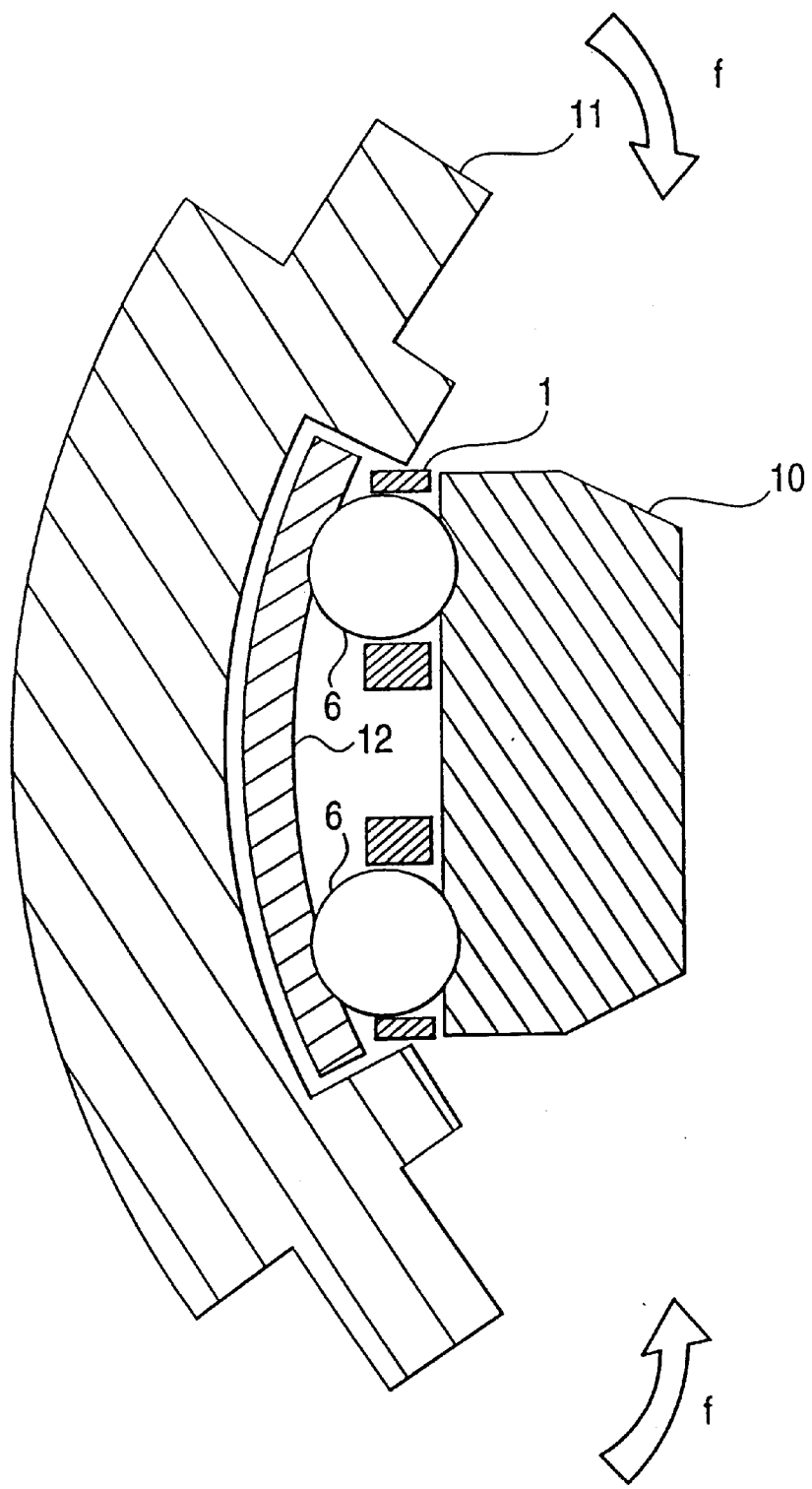
FIG. 2 is a section view of the conventional power roller bearing for use in a toroidal type continuous variable transmission system, showing a state thereof in which an outer race thereof is deformed.
Figure 3:
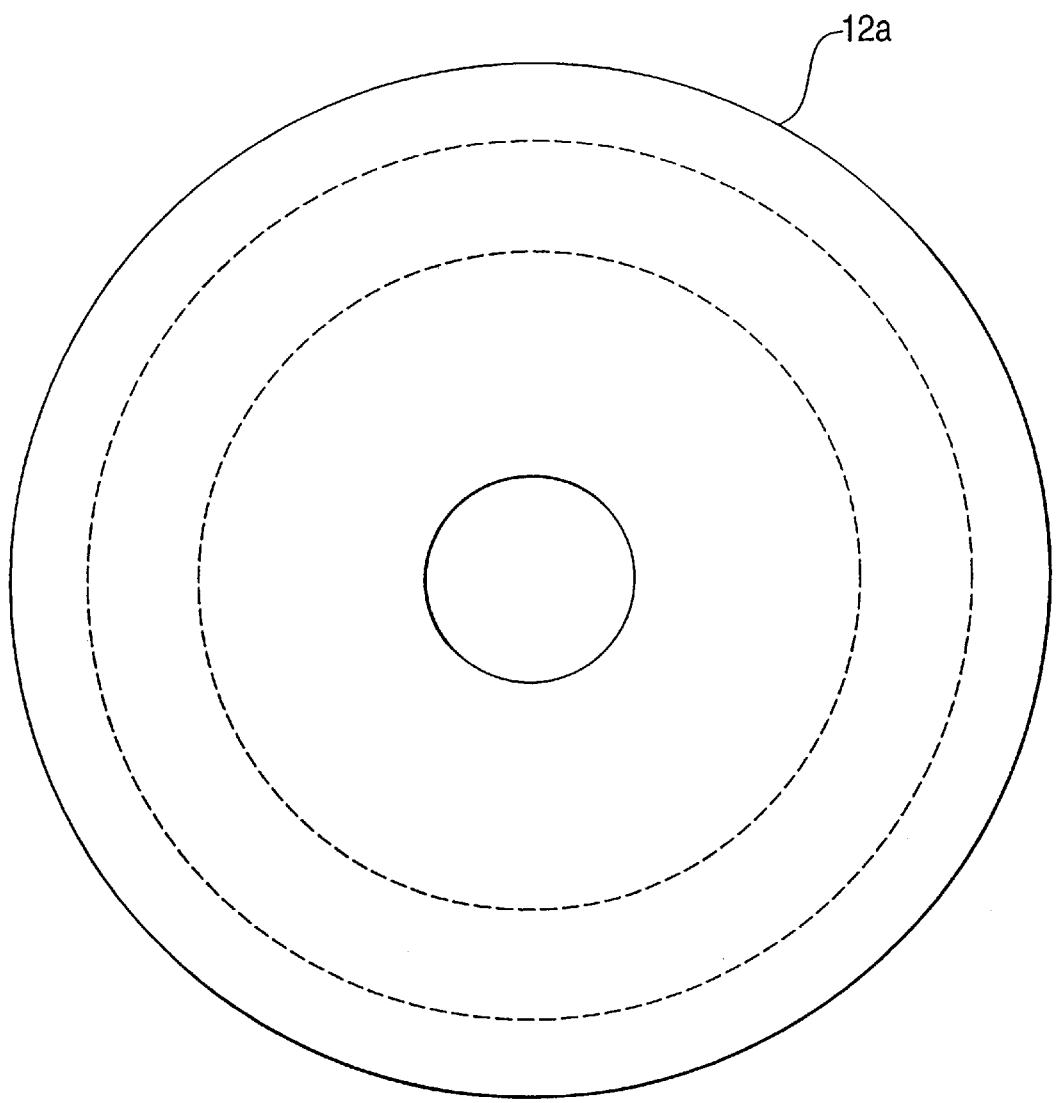
FIG. 3 is a front view of an outer race of a power roller bearing used in a conventional toroidal type continuous variable transmission system, showing a state thereof before it is deformed.
Figure 4:
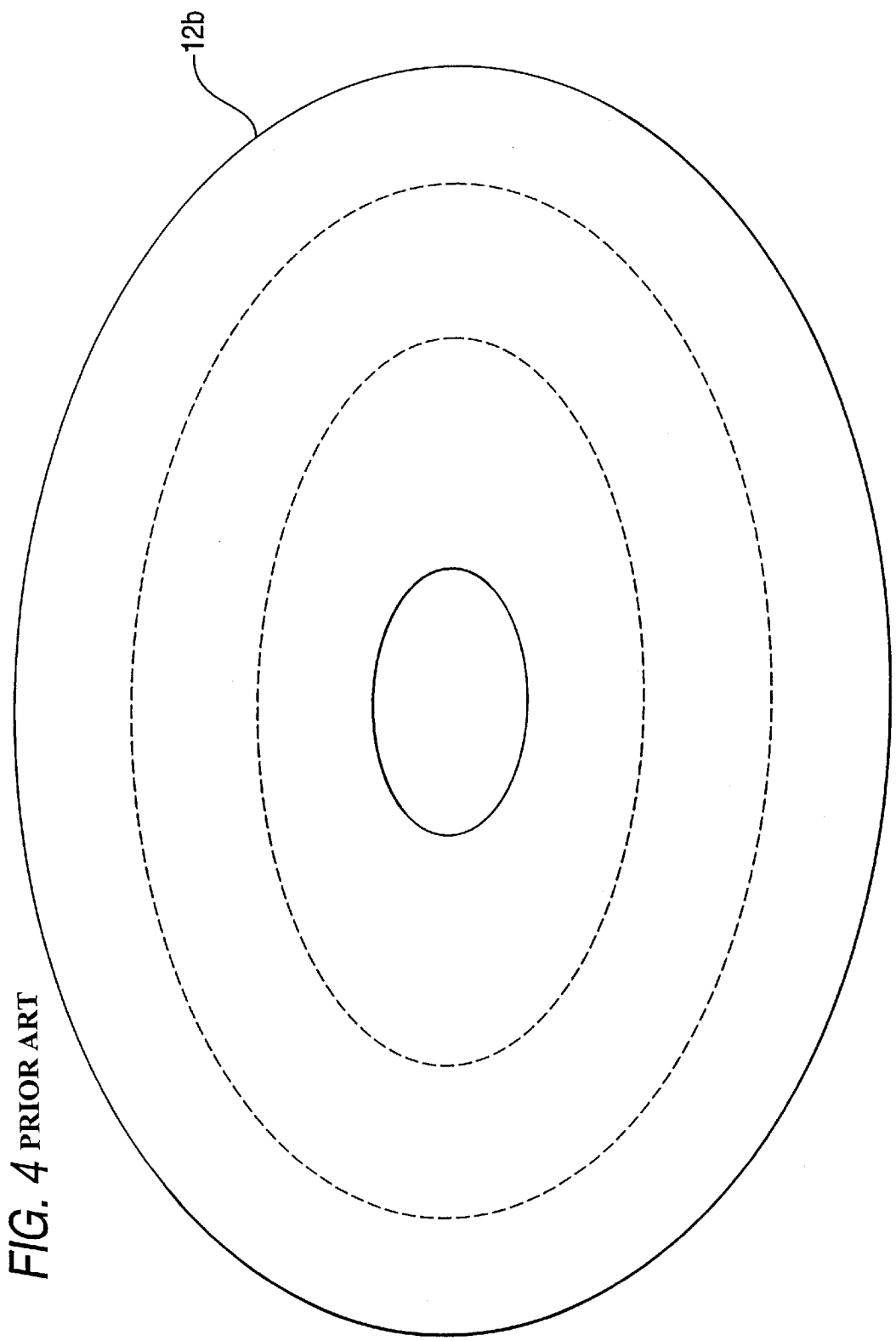
FIG. 4 is a front view of an outer race of a power roller bearing used in a conventional toroidal type continuous variable transmission system, showing a state thereof after it is deformed.
Figure 5:
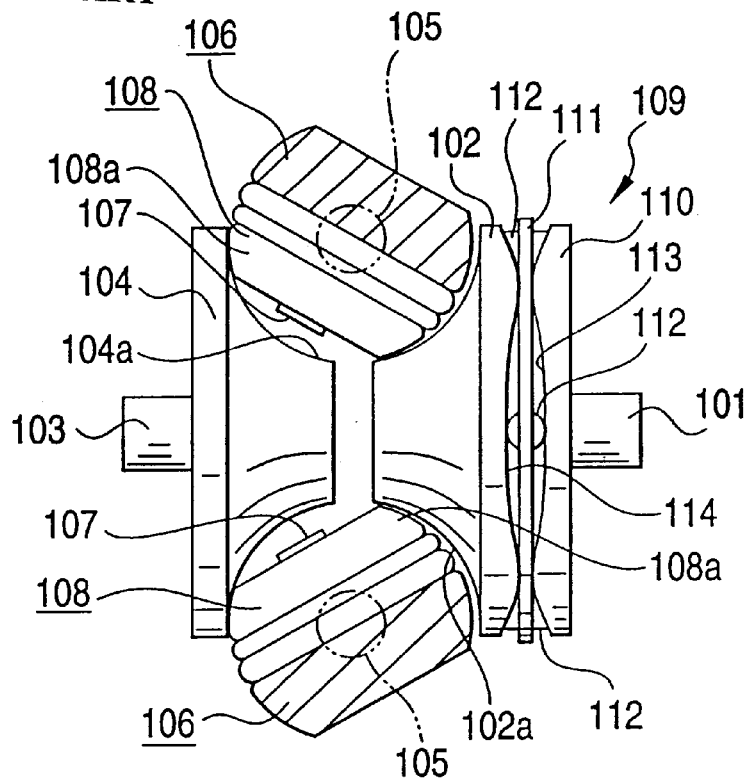
FIG. 5 is a side view of the basic structure of another conventional toroidal type continuous variable transmission system, showing a state thereof occurring when an automobile speed is reduced most.
Figure 6:
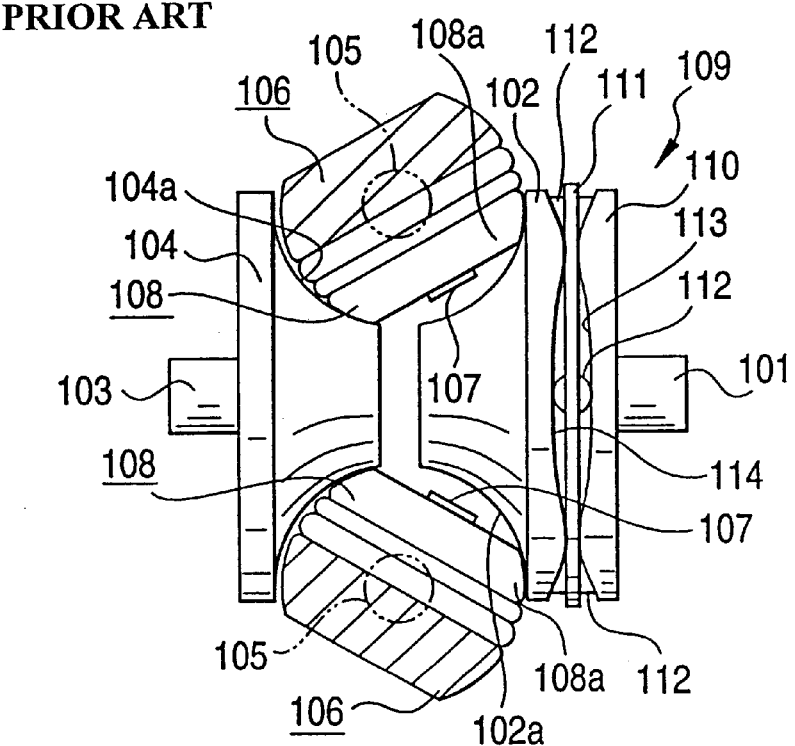
FIG. 6 is a side view of the basic structure of the conventional toroidal type continues variable transmission system, showing a state thereof occurring when an automobile speed is increased most.
Figure 15:
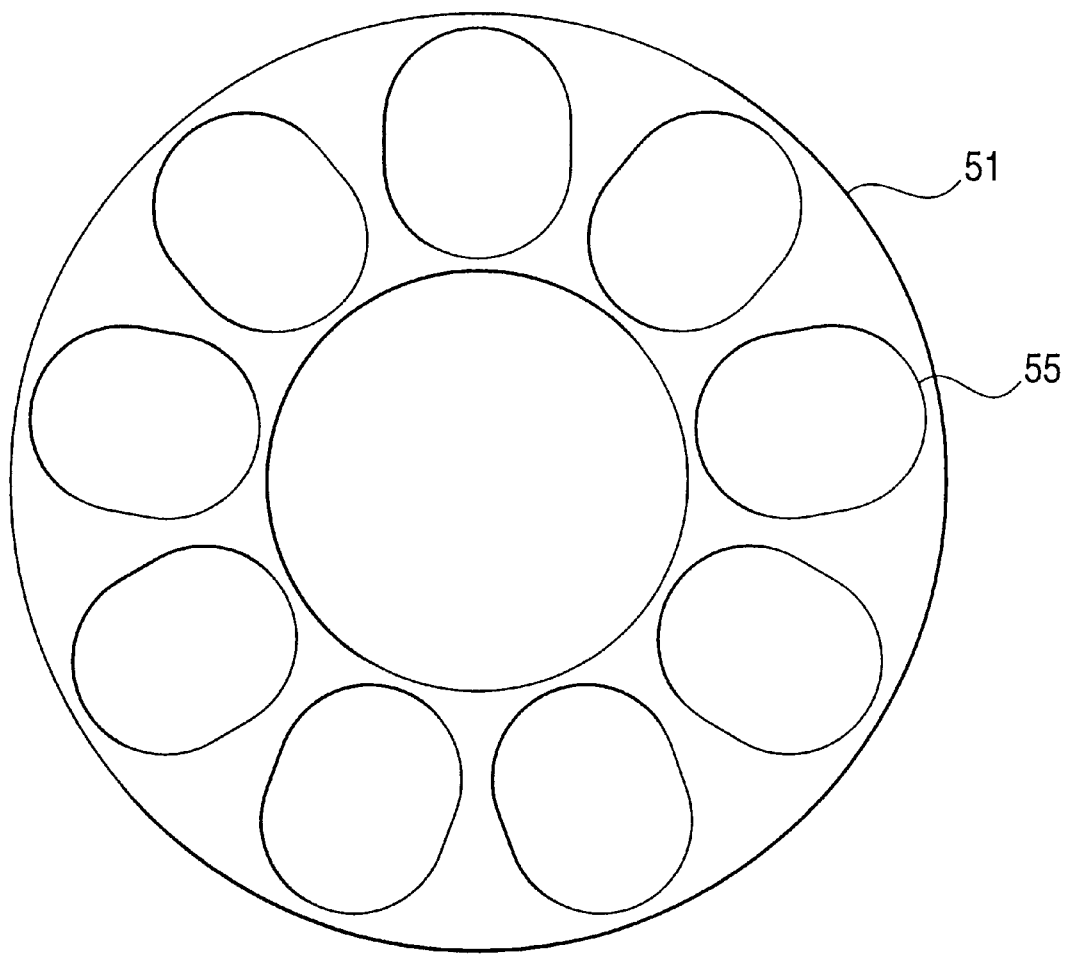
FIG. 15 is a front view of a second embodiment of a cage employed in a power roller bearing for use in a toroidal type continuous variable transmission system according to the present invention.

Now, FIG. 15 shows a second embodiment of a cage to be incorporated in a power roller bearing for use in a toroidal type continuous variable transmission system according to the present invention. In the present embodiment, a cage 51 consists of a single continuous plate, while the dimensions of pocket holes 55 formed in the cage 51 in the radial direction of the cage are respectively set greater than the dimensions thereof in the circumferential direction of the cage. In the present embodiment which uses balls as the rolling elements, each pocket hole 55 is formed in an elliptic shape in which the axial length thereof in the radial direction of the cage is greater than the axial length thereof in the circumferential direction of the cage. Also, each pocket hole 55 is formed such that, similarly to the embodiment shown in FIG. 1, it extends through the cage in the thickness direction of the cage; and, the pocket holes 55 are respectively arranged along the circumferential direction of the cage in such a manner that they correspond to the loci of the race grooves formed in both of the power roller and bearing outer race.

In the cage which includes the pocket holes 55 each having the above-mentioned shape, the rolling elements are respectively held within their corresponding pocket holes 55 in such a manner that they are allowed to shift in position in the radial direction of the cage. Therefore, even when the outer race of the power roller bearing is deformed due to the bending moment applied thereto from the trunnion so that the loci of the race grooves are turned out of their original shape or a perfectly circular shape, the respective rolling elements are able to roll smoothly while shifting in position in the radial direction of the cage, thereby preventing generation of an excess force which restricts the rolling motion of the rolling elements.

The power roller bearing for use in a toroidal type continuous variable transmission system according to the present invention, which includes the above-structured cage, similarly to the previously described conventional power roller bearing, is interposed between the power roller and the trunnion. By the way, in the above-mentioned respective embodiments, each pocket hole is formed in a circular shape or in an elliptical shape because a ball is used as a rolling element; but, when the rolling element is a roller or a needle-like roller, the pocket hole may have a shape which corresponds to the roller or needle-like roller.

With use of the power roller bearing for use in a toroidal type continuous variable transmission system according to the above embodiments, even if the outer race of the power roller bearing is deformed due to the bending moment applied thereto from the trunnion, the outer race of the power roller bearing does not restrict the rolling motion of the rolling elements, so that the rolling elements are allowed to roll smoothly. This prevents slippage not only in the contact portions between the rolling elements and outer race but also in the contact portions between the rolling elements and cage, which in turn prevents the peripheral faces of the respective rolling elements as well as the respective race grooves against damage. As a result of this, the reliability of the power roller bearing can be enhanced and thus the life thereof can also be extended.

Figure 16:
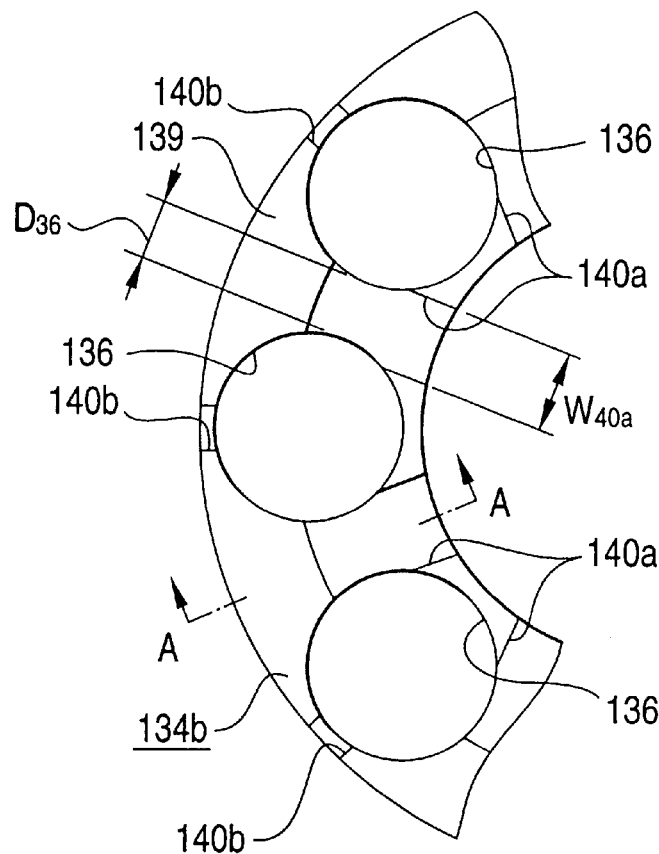
FIG. 16 is a partial plan view of a cage employed in a power roller bearing according to the present invention.
Figure 17:
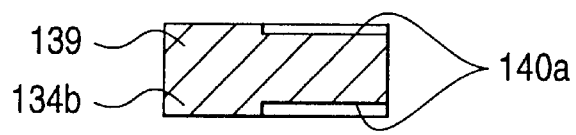
FIG. 17 is a section view taken along the line A—A shown in FIG.
Figure 18:
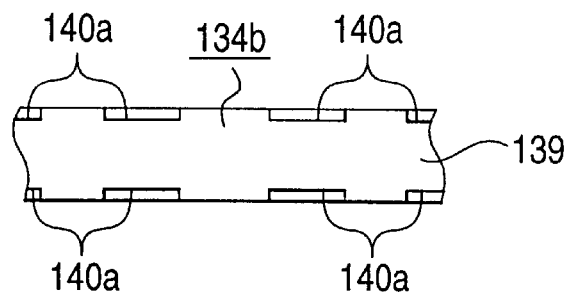
FIG. 18 is a view of the portion of FIG. 17 when viewed from the right side thereof.

Now, FIGS. 16 to 18 respectively show a third embodiment of a power roller bearing for use in a toroidal type continuous variable transmission system according to the present invention. The present embodiment is characterized by a structure in which, even if the amounts of lubrication oil existing in the periphery of a cage 134b are uneven along the circumferential direction of the cage, the degree of unevenness of the amounts of lubrication oil flowing into pockets 136 can be controlled. By the way, the remaining portions of the present embodiment are similar in structure and operation to the previously described conventional power roller bearing. Thus, the illustration as well as description of the equivalent parts of the present embodiment to the conventional power roller bearing are omitted or simplified here. That is, description will be given below mainly of the characteristic portions of the present embodiment.

Figure 7:
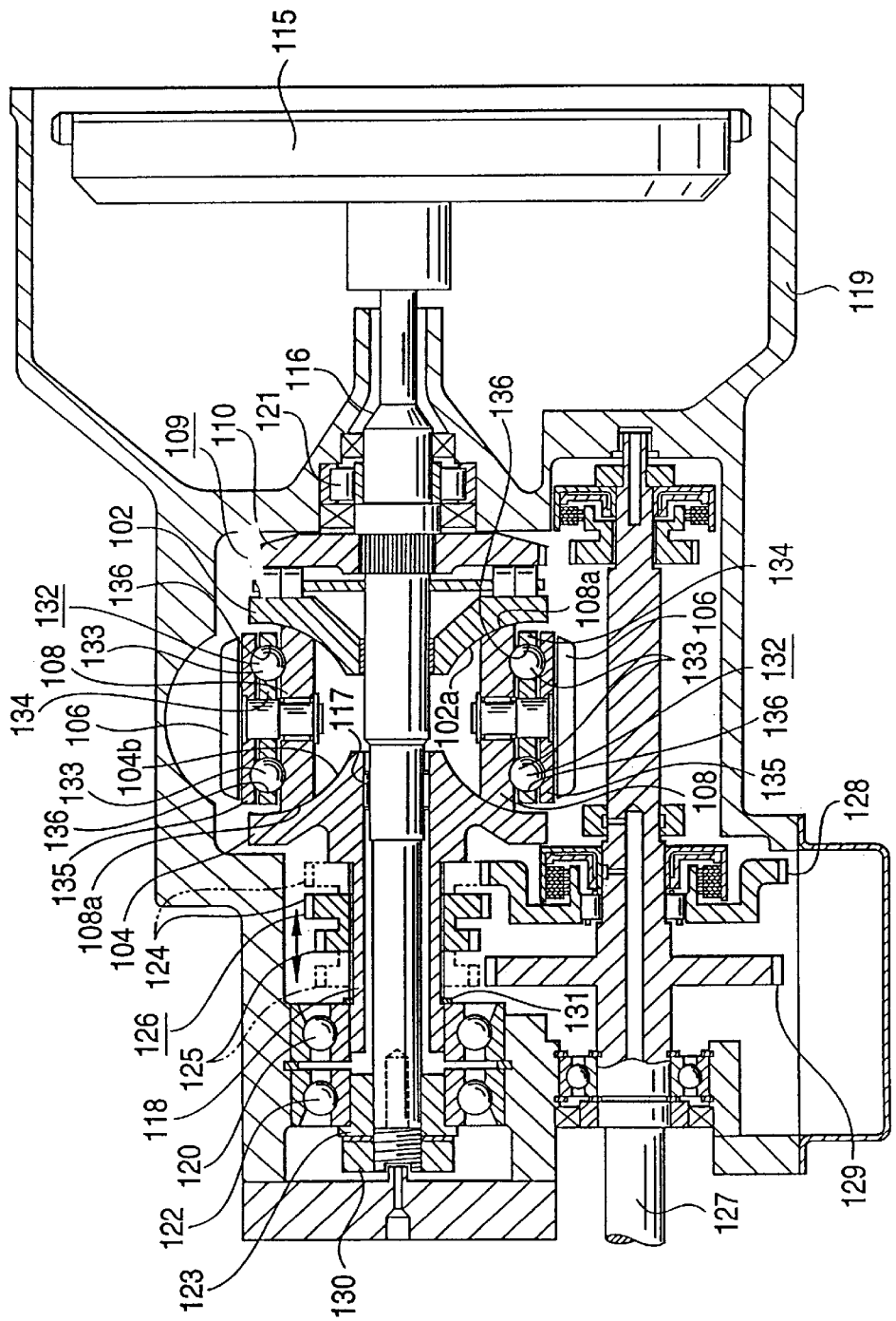
FIG. 7 is a section view of an example of a conventional concrete structure of a toroidal type continuous variable transmission system.
Figure 10:
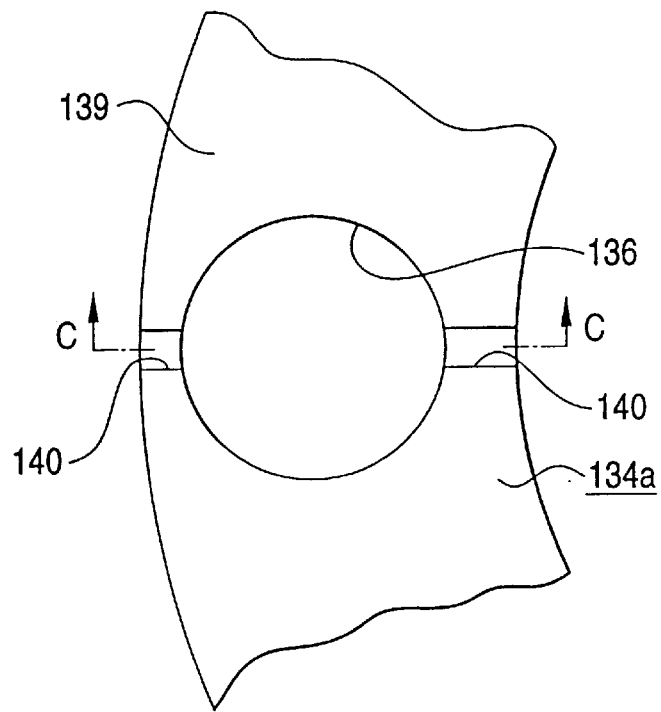
FIG. 10 is a partial plan view of a cage, showing an example of a conventional structure for enhancing lubrication performance.
Figure 11:
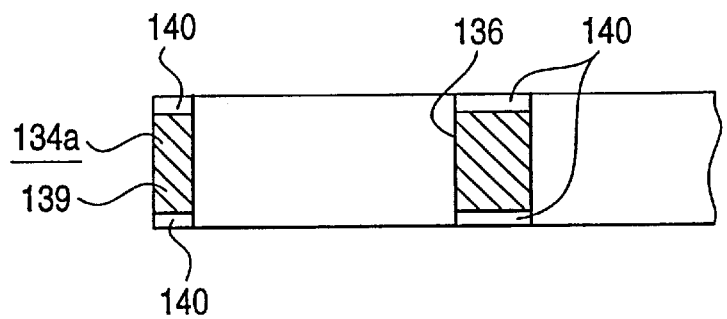
FIG. 11 is a section view taken along the line C—C in FIG. 10.
Figure 12:
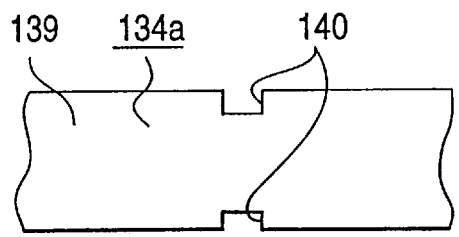

In a circular-ring-shaped main body 139 which forms the above-mentioned cage 134b, in particular, in the middle portion thereof in the diameter direction thereof, there are formed a plurality of pockets 136 in such a manner that they respectively extend in the circumferential direction of the cage and are spaced at regular intervals from one another. And, in the inner and outer faces (the both faces in the axial direction) of the main body 139, there are formed a plurality of recessed grooves 140a, 140b in such a manner that they cross the pockets 136 respectively. These recessed grooves 140a, 140b cooperate in forming a plurality of lubrication oil flow passages which are respectively formed between the inner and outer peripheral edges of the main body 139. When the toroidal type continuous variable transmission system is in operation, in the respective lubrication oil flow passages, the lubrication oil that is jetted out from the above-mentioned oil supply holes 138 (see FIG. 8) is allowed to flow from the inner peripheral edge side of the main body 139 toward the outer peripheral edge side thereof. During such flow, the lubrication oil lubricates the contact portions between the rolling faces of the rolling elements 133 (see FIGS. 7 and 8) respectively held in the pockets 136 and their mating race faces.

Figure 13:
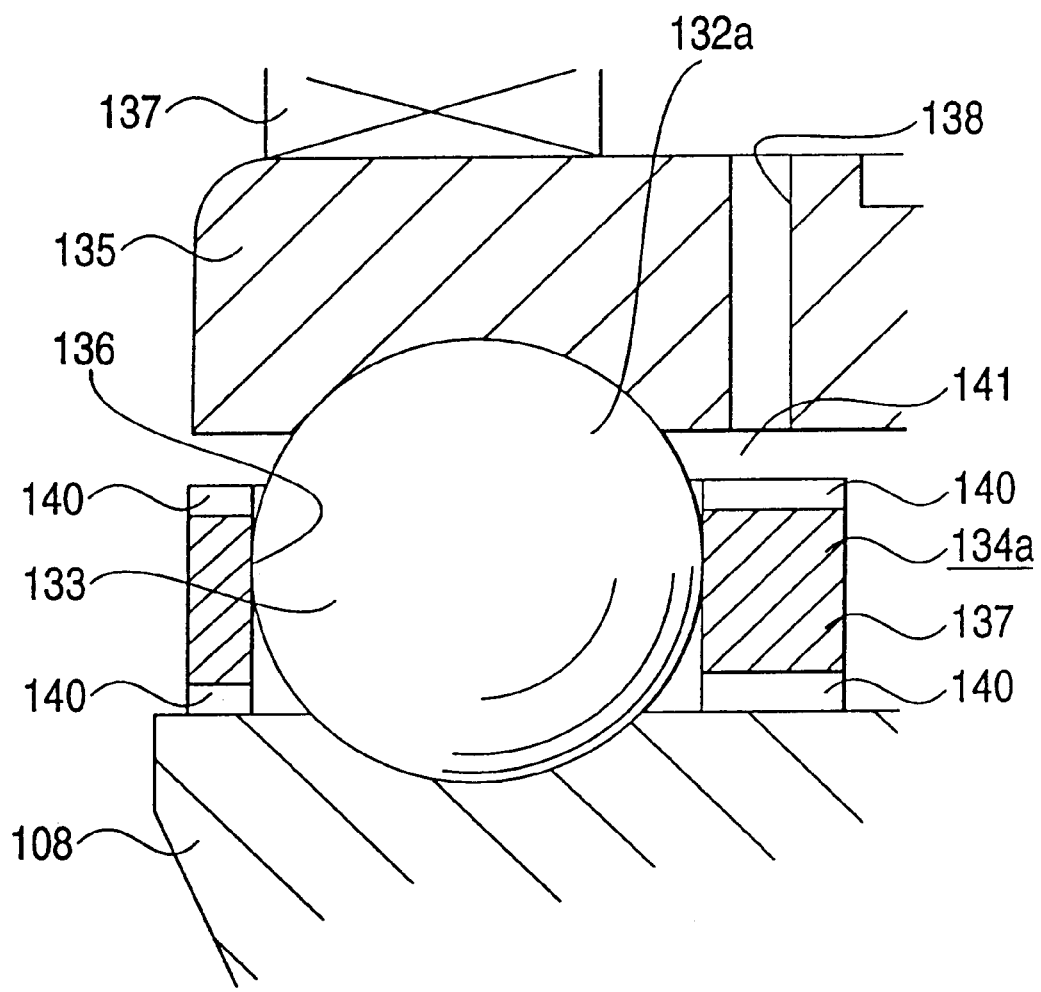
FIG. 13 is a view corresponding to the B portion in FIG. 8, showing a thrust rolling bearing portion into which the cage shown in FIGS. 10 to 12 is incorporated.

Among the recessed grooves 140a, 140b forming the respective lubrication oil flow passages, the recessed grooves 140a (which provide the upstream side portions) are formed in the circumferential direction intermediate portions of the mutually adjoining pockets 136 in the circumferential direction of the cage 134b. The recessed grooves 140a bring the pockets 136 into communication with the inner peripheral edge of the main body 139 and feeds the lubrication oil jetted out from the oil supply holes 138 into the spaces 141 (see FIGS. 8 and 13), in particular, into the portions near the inside diameter of the cage 134b into their respective pockets 136. Also, the width $W_{40a}$ of the recessed grooves 140a providing the upstream side portions is set slightly greater than the distance $D_{36}$ between the circumferentially adjoining pockets 136 (that is, $W_{40a} > D_{36}$). And, the upstream side end portions (inside diameter side end portions of the cage 134b) of such recessed grooves 140a are opened at the inner peripheral edge of the cage 134b and, similarly, the downstream side end portions thereof are opened at the peripheral edge portions of the respective pockets 136. Therefore, on receiving the lubrication oil jetted out from the oil supply holes 138 into the spaces 141, the recessed grooves 140a passes the lubrication oil outwardly in the diameter direction of the cage 134b so that the lubrication oil can be distributed over to the circumferentially adjoining pockets 136.

On the other hand, the recessed grooves 140b (which provide the downstream side portions), which discharge the lubrication oil existing within the pockets 136 therefrom, are formed in the intermediate portions of the pockets 136 so as to be able to bring the pockets 136 into communication with the outer peripheral edge of the main body 139. The lubrication oil, which is sent from the recessed grooves 140b into the pockets 136, in more particular, into the two circumferential sides of the cage 134b inside diameter side half sections thereof, flows not only in the diameter direction of the cage 134b but also in the circumferential direction thereof and, after then, it is discharged therefrom through the recessed grooves 140b to the outside diameter side of the cage 134b.

In the toroidal type continuous variable transmission system according to the present invention which incorporates therein a thrust rolling bearing with the cage 134b including the lubrication oil flow passages respectively composed of the above-mentioned recessed grooves 140b, the lubrication oil that has flowed into the recessed grooves 140a forming the lubrication oil flow passages is distributed over to the circumferentially adjoining pockets 136. The recessed grooves 140a providing the upstream side portions are formed in the intermediate portions of the pockets 136, whereby the lubrication oil is sent into each of these pockets 136 from their corresponding two recessed grooves 140a. Thanks to this, even if the amounts of lubrication oil existing in the periphery of the cage 134b are uneven along the circumferential direction of the cage, the degree of unevenness of the amounts of lubrication oil flowing into the pockets 136 can be controlled. As a result of this, it is possible to prevent an amount of lubrication oil to be supplied into any particular pocket 136 from being short, which in turn can prevent worsened wear in the contact portion between the rolling face of a rolling element 133 held within the present pocket 136 and its mating race face.

With use of the present toroidal type continuous variable transmission system, since it is structured and can be operated in the above-mentioned manner, the lubrication performance of the thrust rolling bearing attached to the power roller can be improved. This makes it possible to improve the reliability and durability of the toroidal type continuous variable transmission system incorporating the present thrust rolling bearing therein.

Figure 19:
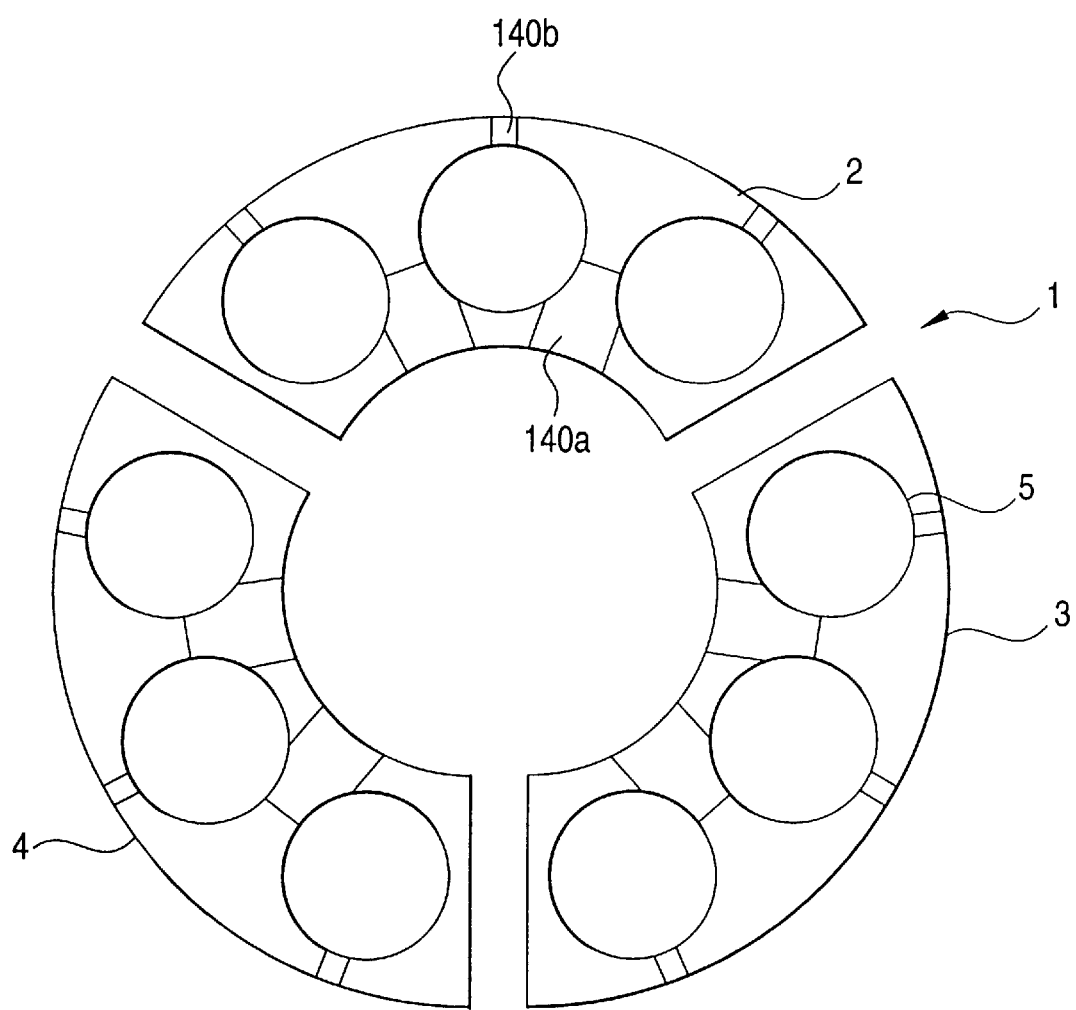
FIG. 19 is a front view of a fourth embodiment of a cage employed in a power roller bearing for use in a toroidal type continuous variable transmission according to the present invention.

Now, FIG. 19 shows a cage employed in a power roller bearing for use in a toroidal type continuous variable transmission system according to a fourth embodiment of the present invention. The present embodiment is a combination of the first and the third embodiments. Namely, the recessed grooves 140a and 140b of the third embodiment are provided on each of the hold plates 2, 3 and 4 of the first embodiment. Accordingly, similar effects mentioned in the respective embodiments can be obtained.

Figure 20:
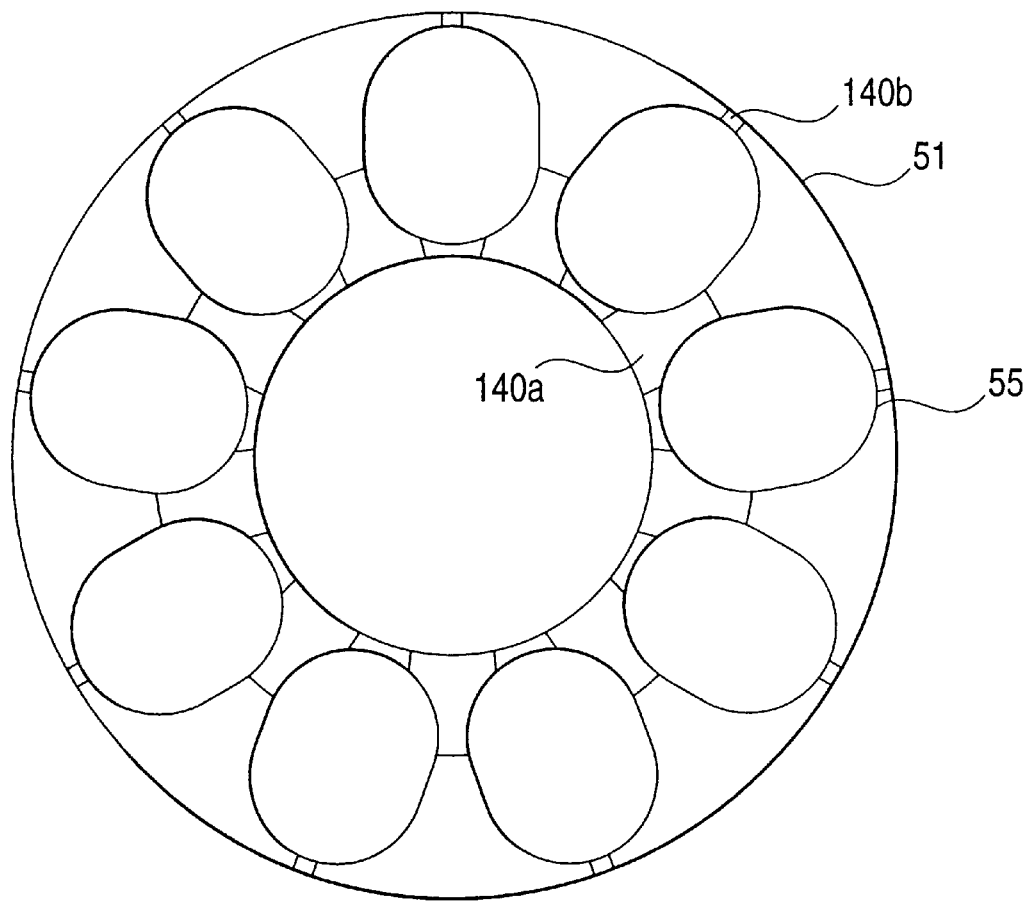
FIG. 20 is a front view of a fifth embodiment of a cage employed in a power roller bearing for use in a toroidal type continuous variable transmission system according to the present invention.

FIG. 20 shows a cage employed in a power roller bearing for use in a toroidal type continuous variable transmission system according to a fifth embodiment of the present invention. The present embodiment is a combination of the second and the third embodiments. Namely, the recessed grooves 140a and 140b of the third embodiment are provided on the cage 51 of the second embodiment. Accordingly, similar effects mentioned in the respective embodiments can be obtained.

It is contemplated that numerous modifications may be made to the apparatus of the present invention without departing from the spirit and scope of the invention as defined in the following claims.

What is claimed is:

1. A power roller for a toroidal type continuous variable transmission system comprising:

a trunnion having a central shaft with a longitudinal axis;

a bearing outer race connected to the trunnion, one face of which is provided with a first track groove that extends around a central axis that is concentrically aligned with the longitudinal axis of the central shaft;

a power roller rotatably mounted on one end portion of the central shaft, the power roller having a face opposing to the one face of the bearing outer race, the face being provided with a second track groove that extends around the central axis that is concentrically aligned with the longitudinal axis of the central shaft;

a plurality of rolling elements retained between the bearing outer race and the power roller and capable of rotating within a track formed by the first track groove and the second track groove; and a disk-shaped cage coaxially disposed between the bearing outer race and the power roller and rotatable about the central shaft, the cage including a plurality of through pockets for accommodating the rolling elements therein so as to retain the rolling elements within the track, the pockets being spaced about the circumference at regular intervals wherein the cage accommodates a relief movement of the rolling elements in a radial direction, the relief movement resulting from a deformation of the bearing outer race.

2. The power roller as set forth in claim 1, wherein the cage comprises:

a plurality of hold plates formed by dividing the cage at regular angles around the circumference of the cage, each of the hold plates independently movable in the radial direction.

3. The power roller as set forth in claim 2, wherein the bearing outer race includes an oil supply passage for supplying a lubrication oil to the cage, the cage includes first oil grooves for supplying the lubrication oil supplied from the oil supply passage to the through pockets and second oil grooves for discharging the lubrication oil in the through pockets to the outside of the cage, each of the first oil grooves is positioned between consecutive through pockets and communicates the consecutive through pockets with each other, and each of the second oil grooves communicates the respective through pocket with the outside of the cage.

4. The power roller as set forth in claim 1, wherein each of the through Pockets in the cage is formed such that the respective rolling element is movable therein in the radial direction.

5. The power roller as set forth in claim 4, wherein each of the through pockets is formed such that a length dimension thereof in the radial direction is longer than a length dimension in a direction that is perpendicular to the radial direction.

6. The power roller as set forth in claim 4, wherein the bearing outer race includes an oil supply passage for supplying a lubrication oil to the cage, the cage includes first oil grooves for supplying the lubrication oil supplied from the oil supply passage to the through pockets and second oil grooves for discharging the lubrication oil in the through pockets to the outside of the cage, each of the first oil grooves is positioned between consecutive through pockets and communicates the consecutive through pockets with each other, and each of the second oil grooves communicates the respective through pocket with the outside of the cage.

* * * * *